United States Patent
Bakshi et al.

(10) Patent No.: US 8,189,566 B2
(45) Date of Patent: May 29, 2012

(54) SOFTWARE BASED TRADING TURRET

(75) Inventors: Aseem Bakshi, Stamford, CT (US); Rajnish Jain, Fairfield, CT (US); Andrew G. Klaiber, Trumbull, CT (US); Kathleen N. Udall, Oxford, CT (US); Ravi K. Vankayala, Milford, CT (US)

(73) Assignee: IPC Systems, Inc., Jersey City, NJ (US)

( * ) Notice: Subject to any disclaimer, the term of this patent is extended or adjusted under 35 U.S.C. 154(b) by 487 days.

(21) Appl. No.: 12/476,490

(22) Filed: Jun. 2, 2009

(65) Prior Publication Data
US 2009/0304168 A1  Dec. 10, 2009

Related U.S. Application Data

(60) Provisional application No. 61/059,143, filed on Jun. 5, 2008.

(51) Int. Cl.
*H04L 12/66* (2006.01)
(52) U.S. Cl. .................. 370/352; 370/463; 379/156
(58) Field of Classification Search .................. 370/352, 370/463; 379/156
See application file for complete search history.

(56) References Cited

U.S. PATENT DOCUMENTS
6,212,177 B1 * 4/2001 Greene et al. .................. 370/352
* cited by examiner

*Primary Examiner* — Creighton Smith
(74) *Attorney, Agent, or Firm* — Fitzpatrick, Cella, Harper & Scinto (57) ABSTRACT

A communications system including a turret switching system constructed to communicate to a Web server, a turret device, and to a remote communications device via a first communications network, the Web server being constructed to communicate to a client device via a second communications network, and the client device constructed to control switching across a plurality of lines.

18 Claims, 9 Drawing Sheets

SOFTWARE BASED TRADING TURRET

CROSS REFERENCE TO RELATED APPLICATIONS

This application claims priority to, and the benefit of, U.S. Provisional Patent Application Ser. No. 61/059,143, filed Jun. 5, 2008, which is hereby incorporated by reference in its entirety.

BACKGROUND OF THE INVENTION

1. Field of the Invention

The present invention generally relates to telecommunication systems, and more particularly to key telephone systems and trading turrets.

2. Description of the Related Art

A trading turret system is a specialized telephony switching system that allows a relatively small number of users to access a large number of external lines and provides enhanced communication features such as hoot-n-holler, push-to-talk, intercom, video and large-scale conferencing. These features are often utilized in the financial industry such as trading floor environments, as well as security/law enforcement, utilities, healthcare, and customer support (e.g., contact centers) environments.

Users interface with a turret switching system through a trading turret device, which can be implemented in dedicated hardware (sometimes referred to as a "hard" turret) or in a general-purpose computer (sometimes referred to as a "soft" turret). A hard-turret is a phone-like desktop device with multiple handsets, speakers and buttons. A soft-turret is a software application that runs on a trader's desktop personal computer (PC) or on a mobile computer such as a PDA (Personal Digital Assistant). A soft-turret application may be controlled using the native control interface that the computer provides such as a touch screen, stylus, click wheel, or mouse and keyboard. In addition to rendering a graphical image of the turret on the PC screen, the soft-turret application may also provide voice, instant messaging and presence features.

With the introduction of Session Initiation Protocol ("SIP") based architectures, new features and interoperability with a wide variety of SIP enabled devices is possible. SIP is an application-layer control (i.e., signaling) protocol for creating, modifying, and terminating sessions such as Internet telephony calls with one or more participants and is defined in RFC-3261, "SIP: Session Initiation Protocol". SIP has been used in typical IP based networks as the predominant way of signaling between stations and telephony systems and as the trunking protocol between telephony systems. SIP also can be used in conjunction with other protocols such as Session Description Protocol "SDP" and Real-Time Protocol "RTP" to provide communications services.

With the advent of Voice over Internet Protocol ("VoIP"), VoIP turret devices have moved from a fixed environment of dedicated voice communications trading resources to a more virtualized and remotely accessible trading environment across multiple sites. This virtual environment allows trader mobility (e.g., to roam across multiple trading floors), and disaster recovery planning and resources (e.g., remote access to their private wires) to be shared dynamically, when and where required, across a global corporate enterprise.

Figure 1:
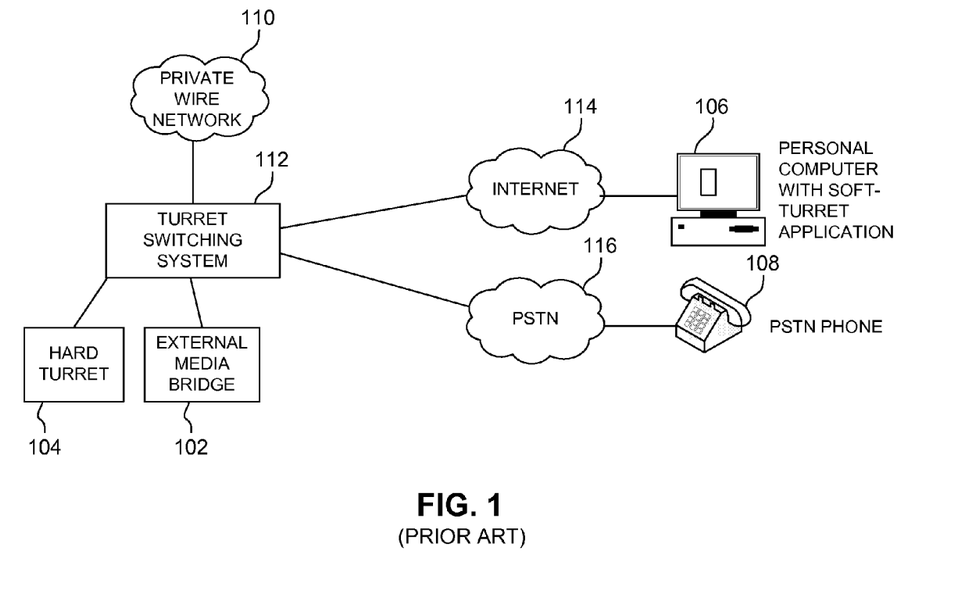
FIG. 1 depicts a diagram of a prior art soft-turret system.

FIG. 1 shows an overview of a previous generation soft-turret product. This system makes us of an external hardware media bridge 102 and a hard-turret 104 for one soft-turret instance to operate. Hard-turret 104 typically includes two handsets, commonly referred to as a Left Handset "LHS" and a Right Handset "RHS" and multiple speaker devices. This allows a trader to have many independent voice conversations simultaneously. A soft-turret 106 is typically connected to a turret switching system 112 through a network such as the Internet 114 and is accompanied by a single phone device for voice delivery. Thus, soft-turret users have a single handset only.

To accommodate for this, a typical soft-turret product makes use of the external media bridge 102 to bridge the LHS to RHS so that one channel is used to connect to the private wire network 110 and the other channel is used to connect a public-switched-telephone-network or PSTN phone 108 over a PSTN network 116. This solution is costly, however, because it requires an external piece of hardware and requires a hard-turret to be dedicated to the remote trader.

Typical soft phones have other practical limitations. For example, a soft-phone runs on a PC and is typically connected to an organization's private branch exchange (PBX) and makes use of VoIP to communicate with the PBX. In such configurations, the soft-phone can exchange signaling (e.g., SIP) and media (e.g., RTP) with the PBX but does not have a dedicated data channel with the PBX for rendering a display to the user. Soft phones are typically also not capable of delivering multiple conversations (such as multiple handsets and speakers as is the case in turrets) simultaneously.

Another factor that must be taken into consideration when dealing with trader communications is voice quality. Voice quality requirements (such as voice cut-through times) in a trading environment are significantly more stringent than in an enterprise PBX environment. For instance, as soon as a trader seizes a private wire, voice communications must be established immediately (e.g., <50 ms) such that a single spoken syllable from the trader is not dropped.

Another bottleneck in existing trader systems is their computing systems. A trader's personal computer may be running many voice applications simultaneously such as Voice and Instant Messaging clients, Web browsers with voice enabled Web pages, etc. In addition, the personal computer's operating system is usually non-real time, which means it is not capable of switching tasks in real time in order to preempt low priority tasks to allow applications delivering voice media to run. Sending the voice to trader's PSTN (Public Switched Telephone Network) phone line thus presents contention issues.

BRIEF DESCRIPTION

The example embodiments described herein meet the above-identified needs by providing methods, systems and computer-readable medium for providing a software-based trading turret.

In one example embodiment, a turret switching system communicates to a Web server, a turret device, and to a remote communications device via a first communications network. The Web server communicates to a client device via a second communications network. The client device controls switching across a plurality of lines.

In another example embodiment, a computer-readable medium having stored thereon sequences of instructions is provided. The sequences of instructions include instructions which when executed by a computer system causes the computer system to communicate to a Web server, a turret device, and to a remote communications device via a first communications network, communicate to a client device via a second communications network, and control switching across a plurality of lines.

In yet another example embodiment, a method for providing a software based trading turret is provided by communicating, by a turret switching device, to a Web server, a turret device, and a remote communications device, via a first communications network. The method also provides communicating, by the turret switching device, to a client device via a second communications network; and controlling switching across a plurality of lines, by the turret switching device.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments of the invention presented herein will become more apparent from the detailed description set forth below when taken in conjunction with the drawings in which like reference numbers indicate identical or functionally similar elements.

DETAILED DESCRIPTION

The example embodiments of the invention presented herein are directed to methods, systems and computer-readable medium for a software based trading turret, which are now described herein in terms of an example trading environment and a remote client. This is for convenience only and is not intended to limit the application of the present invention. In fact, after reading the following description, it will be apparent to one skilled in the relevant art(s) how to implement the following invention in alternative embodiments, such as security/law enforcement, utilities, healthcare, and customer support (e.g., contact centers) environments.

Generally, trader mobility and disaster recovery planning are provided by a system having a trading turret modeled as two parts. One part renders a turret's Graphical User Interface (GUI) on a PC screen and accepts user stimuli while the other part delivers voice communications to the trader.

A soft-turret application is used to facilitate synchronization of both parts by communicating signaling information to/from a turret switching system over a data network such as the public Internet while voice communications are in progress over the PSTN.

Figure 2:
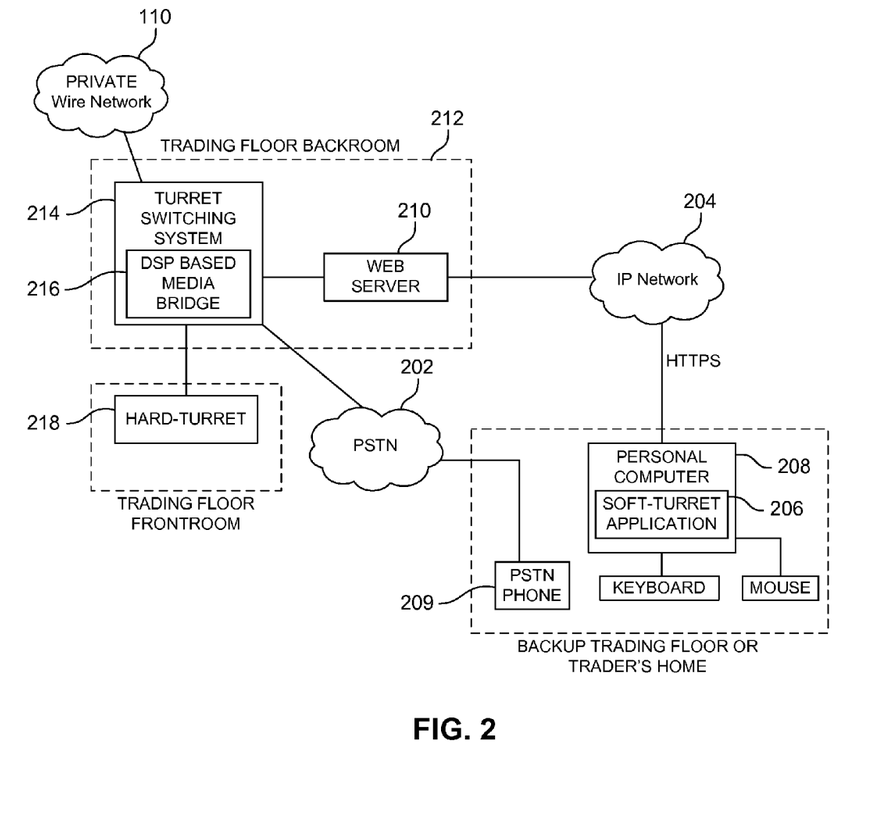
FIG. 2 depicts a system for delivering voice and data over separate communications channels in accordance with an embodiment of the present invention.

FIG. 2 depicts an arrangement in which voice and signaling are communicated between a turret switching system and a remote client at a backup trading floor or trader's home. Particularly, voice is delivered between a turret switching system 214 connected to a private wire network 110 and a PSTN phone 209 through a PSTN 202. Data communications that carry signaling such as display-refreshes and button selections (i.e., "presses") are delivered to/from a PC 208 over an IP network 204 such as the Internet.

A soft-turret application 206 running on PC 208 uses a secure form of HTTP (Hyper-Text Transfer Protocol) for exchanging data with a farm of Web servers 210 deployed in a trading floor backroom 212 environment. Soft-turret application 206 can be launched from a Web browser or as a standalone software application. Once launched, soft-turret application 206 renders a turret on the display of the PC 208, such as one in the trading floor backroom 212, i.e. hard-turret 218.

Once soft-turret application 206 has been subscribed to Web server 210, Web server 210 is enabled to deliver line status change notifications to the soft-turret application 206. This allows soft-turret application 206 to listen for line state changes from the turret system 214 and ensures that the line states are consistent across both systems. For instance, a user of hard-turret 218 seizes a line located in the trading floor backroom, soft-turret application will receive a corresponding notification. For simplicity only one representative Web server is shown.

Several private lines can be coupled to turret switching network 110. One or more of these lines can be fed to PSTN phone 209 through PSTN 202 allowing a trader to have multiple independent voice conversations simultaneously. Soft-turret application 206 is enabled to seize lines on the private wire network 110 and perform functions available on a hard-turret 218 from a remote PC 208. Signaling information associated with the seized lines are communicated to/from the soft-turret application 206.

For example, soft-turret application 206 can deliver button presses to Web server 210, which in turn converts them into the communication protocol understood by the station cards installed in the turret switching system 214. LHS/RHS bridging is performed inside media bridge 216, eliminating the need for an external media bridge or a dedicated hard-turret.

By enabling turret switching system 214 to connect multiple lines on a private wire network 110 to a single PSTN phone 209, a user can communicate to multiple parties that have been remotely connected by turret switching system 214 under the control of a remote client (e.g., PC 208). This permits signaling information and voice connections to be synchronized.

Figure 3:
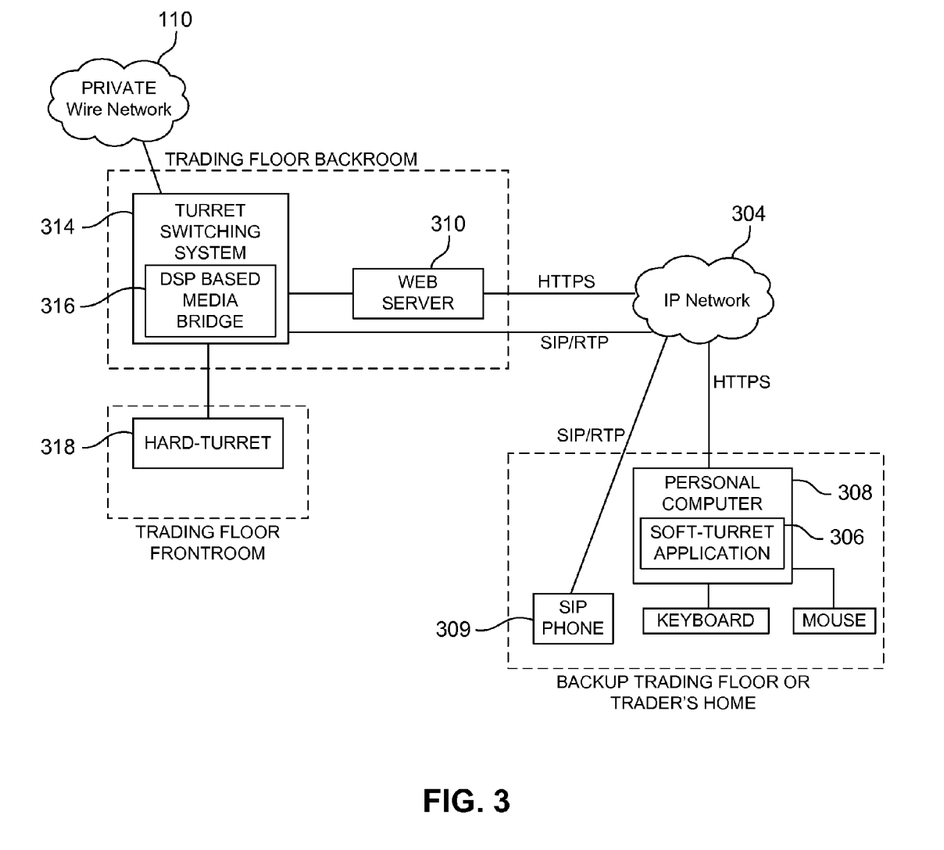
FIG. 3 depicts a system for delivering voice and data over a single data network, where the voice is delivered over a VoIP network using SIP and RTP protocols, in accordance with an embodiment of the present invention.

FIG. 3 depicts a variation of the embodiment described above with respect to FIG. 1. In this arrangement, voice is delivered over a VoIP network using SIP and RTP protocols as opposed to over a PSTN. Particularly, turret switching system 314 delivers voice between a private wire network 110 and a SIP phone 309 via an IP network 304 (e.g., Internet).

Data communications that carry information from a PC 308, such as display refreshes and button selections (i.e., "presses") also are delivered over IP network 304. Particularly, a soft-turret application 306, running on a PC 308 uses a secure form of HTTP (Hyper-Text Transfer Protocol) for exchanging data with a farm of Web servers 310 deployed in the trading floor backroom 312. The soft-turret application 306 may be launched from either within a Web browser or as a standalone software application.

Once soft-turret application 306 has been subscribed to Web server 310, Web server 310 is enabled to deliver line status change notifications to the soft-turret 306. This allows soft-turret application 306 to listen for line state changes from the turret system 314 and ensures that the line states are consistent across both systems. For instance, a user of hard-turret 318 seizes a line located in the trading floor backroom, soft-turret application will receive a corresponding notification.

As described above, several private lines can be coupled to turret switching network 110. These lines can be fed to SIP phone 309 by the turret switching system 314 through IP network 304 allowing a trader to have multiple independent voice conversations simultaneously. In addition, soft-turret application 306 is enabled to seize lines on the private wire network 110 and perform functions available on a hard-turret 318 from a remote PC 308. Signaling information associated with the seized lines is communicated to/from the soft-turret application 306.

For example, soft-turret application 306 can deliver button presses to Web server 310, which in turn converts them into the communication protocol understood by the station cards installed in the turret switching system 314. LHS/RHS bridging is performed inside media bridge 316, eliminating the need for an external media bridge or a dedicated hard-turret.

By enabling turret switching system 314 to connect multiple lines on a private wire network 110 to a single SIP phone 309, a user can communicate to multiple parties that have been remotely connected by turret switching system 314 under the control of a remote client (e.g., PC 308). This configuration thus provides real-time synchronization of the voice and signaling data by separating each into two channels and communicating both channels over an IP network 404.

Figure 4:
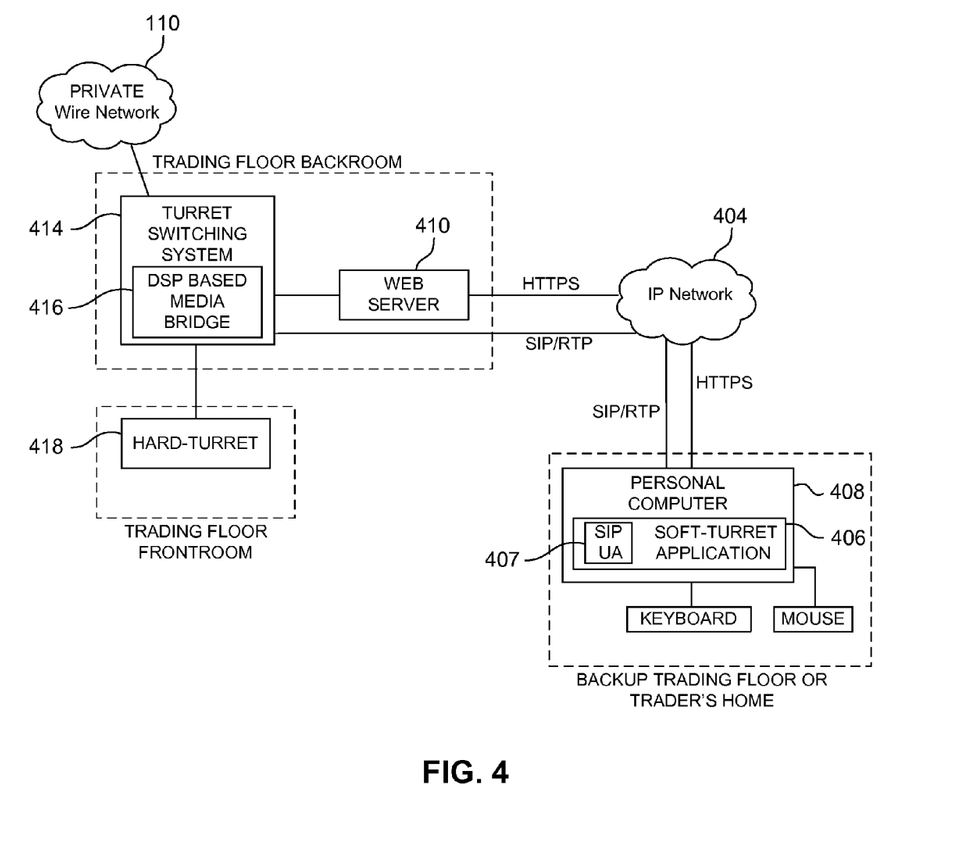
FIG. 4 depicts a system for delivering voice and data over a single data network, where a SIP phone is embedded inside soft-turret application, in accordance with an embodiment of the present invention.

FIG. 4 depicts a system for delivering voice and data communications over a single network, IP network 404. In this embodiment, a SIP phone is embedded inside a soft-turret application 406 running, for example, on a PC 408. Soft-turret application 406 uses a SIP user agent ("UA") 407 to initiate and answer calls. The display refreshes and button selections are delivered over HTTP.

Voice communications are delivered over a VoIP network using SIP and RTP protocols while the data communications such as display refreshes and button selections are delivered using a secure form of HTTP (e.g., HTTPS).

The soft-turret application 406 in this embodiment may be launched from either within a Web browser or as a standalone software application. The Web server 410 delivers line status change notifications to the soft-turret 406, and the soft-turret 406 delivers button presses to the Web server 410. Web server 410, in turn, converts user button press commands into a proprietary communication protocol understood by the station cards installed in the turret switching system 414. In this example, instead of using a PSTN or SIP hard-phone, a trader uses a microphone and speaker(s) connected to PC 408 to exchange voice with the private wire network 110.

Once soft-turret application 406 has been subscribed to Web server 410, Web server 410 is enabled to deliver line status change notifications to the soft-turret application 406. This allows soft-turret application 406 to listen for line state changes from the turret system 414 and ensures that the line states are consistent across both systems. For instance, a user of hard-turret 418 seizes a line located in the trading floor backroom, soft-turret application will receive a corresponding notification. For simplicity only one representative Web server is shown.

Several private lines can be coupled to turret switching network 110. One or more of these lines can be fed to SIP UA 407 through IP network 404 allowing a trader to have multiple independent voice conversations simultaneously. Soft-turret 406 is enabled to seize lines on the private wire network 110 and perform functions available on a hard-turret 418 from a remote PC 408. Signaling information associated with the seized lines are communicated to/from the soft-turret application 406.

For example, soft-turret application 406 can deliver button presses to Web server 410, which in turn converts them into the communication protocol understood by the station cards installed in the turret switching system 414. LHS/RHS bridging is performed inside media bridge 416, eliminating the need for an external media bridge or a dedicated hard-turret.

By enabling turret switching system 414 to connect multiple lines on a private wire network 110 to a single SIP UA 407, a user can communicate to multiple parties that have been remotely connected by turret switching system 414 under the control of a remote client (e.g., PC 408). This permits signaling information and voice connections to be synchronized.

Figure 5:
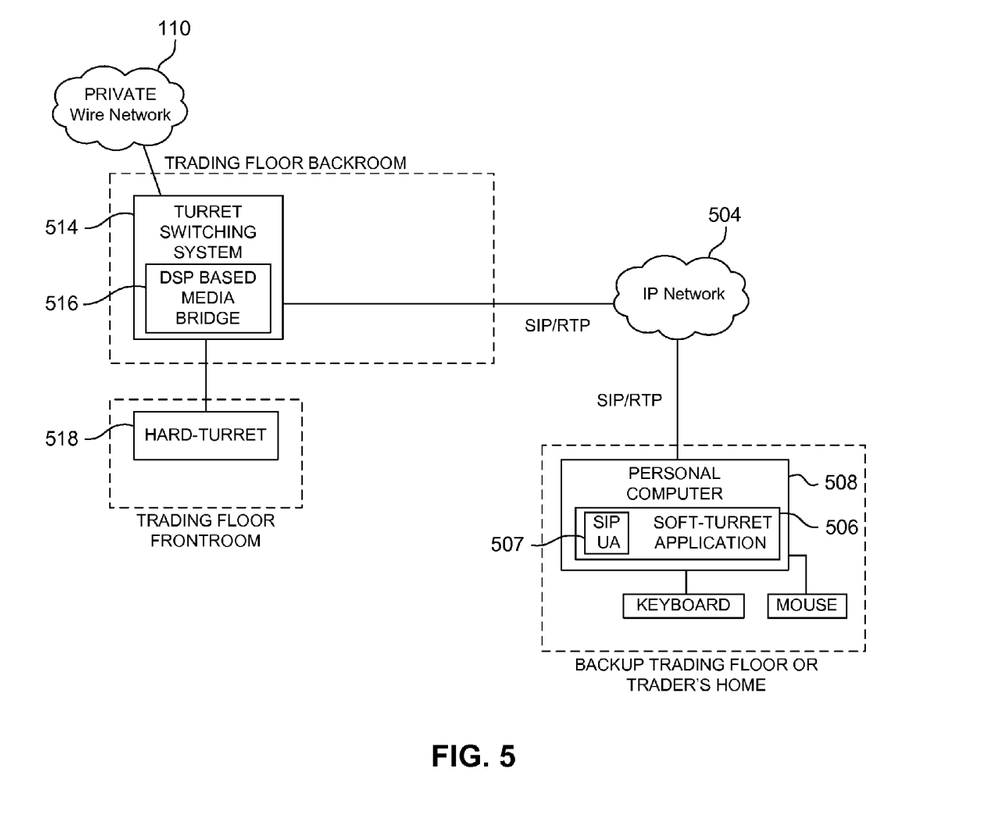
FIG. 5 depicts a system for delivering voice and data using only one signaling protocol for employing voice and data sessions, in accordance with an embodiment of the present invention.

FIG. 5 depicts a system for delivering voice and data using only one signaling protocol for employing voice and data sessions. By employing one signaling protocol for voice and data sessions a converged client is provided. Particularly, no separate data channel (e.g., HTTPS) is required; only SIP/RTP communications are used. Particularly, line status notifications and button presses are delivered as SIP messages and line status notifications and button press requests that were previously delivered over HTTPS are now also delivered over SIP.

Referring still to FIG. 5, a system for delivering voice and data over a single data network, where a SIP phone is embedded inside soft-turret application, is shown. In this embodiment, a trader uses a PC 508 running a soft-turret application 506 for both voice communications and data. Soft-turret application 506 includes a SIP UA 507 to initiate and answer calls between peers. Voice is delivered from PC 508 to a turret switching system 514 over IP network 504 using SIP and RTP protocols. The soft-turret application 506 may be launched from either within a Web browser or as a standalone software application.

Turret switching system 514 delivers line status change notifications to the soft-turret 506, and the soft-turret 506 delivers button presses to the turret switching system 514. In this embodiment, user button press commands are constructed such that they are understood by the station cards installed in the turret switching system 514. A trader use a microphone and speakers connected to the PC 508 to exchange voice.

As illustrated above, none of the embodiments require an external media bridge or a dedicated hard-turret. Instead, LHS/RHS bridging is now done inside a DSP based media bridge placed on the station card through which turret stations connect to the switching fabric. In addition, once a trader is logged in, a communication channel to the PSTN phone, SIP phone, UA, as the case may be, is established. Whether and which line (e.g., from private wire network 110) is communicated to the soft-turret is controlled by the soft-turret application.

Figure 6:
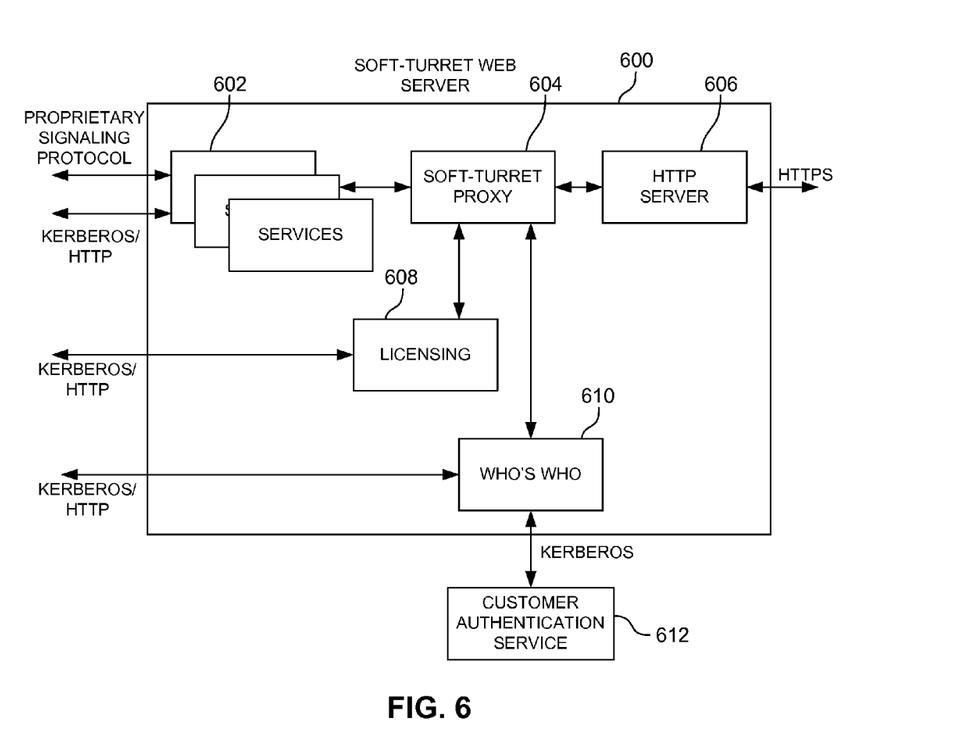
FIG. 6 shows the internal software architecture of a soft-turret Web server in accordance with an embodiment of the present invention.

FIG. 6 depicts the internal software architecture of an example soft-turret Web server 600 in more detail. As shown in FIG. 6, the architecture employs an HTTP server 606 for terminating the HTTP protocol and for serving Web pages. Soft-turret Web server 600 also includes a soft-turret proxy 604 which collects messages communicated over the HTTP protocol and, in turn, communicates them to one or more services 602. A Who's Who component 610 allows a trader to login using, for example, an alphanumeric AoR (Address of Record) as opposed to a numeric TRID (Trader ID). The Who's Who component 610 may also be in communication with a customer authentication server 612 which provides authentication services. This allows soft-turret Web server 600 to utilize customer authentication service 612 using, for example, the Kerberos protocol to facilitate trader log-on. The Kerberos protocol can also be used to encrypt communications between the soft-turret Web server and the turret switching system.

As described above with respect to FIGS. 2-5, the same functionality previously performed on a hard turret is now performed on a soft-turret. When stimulus from a soft-turret is received by HTTP server 606 via a network (e.g., the public Internet) the stimulus is communicated to soft-turret proxy 604. Soft-turret proxy 604, in turn, directs this signaling to either a service 602, a licensing processor 608 or a Who's Who processor 610.

Services provide signaling and other information such as authentication information to the turret switching system (e.g., 214, 314, 414, 514).

In addition, soft-turret Web server 600 can include a licensing component 608 to facilitate authentication. For example licensing component 608 can limit the number of users that are able to login into and use the system, for example based on a predetermined number of allowed users.

The soft-turret Web server also includes several application tasks or processes modules. A single soft-turret web server can support hundreds of simultaneous client connections and each client connection is supported through a set of processes that are run on the operating system.

Figure 7:
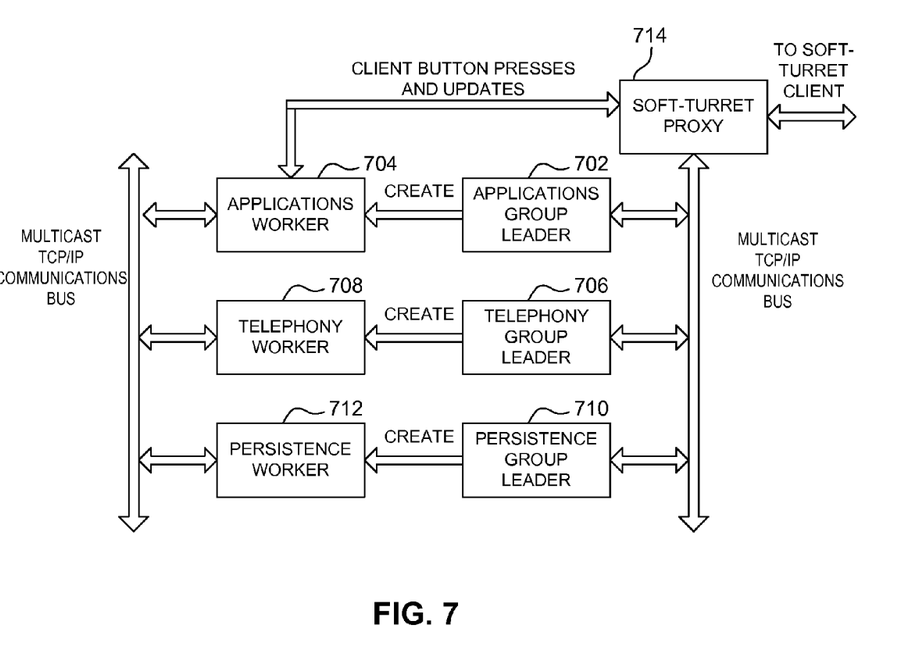
FIG. 7 depicts an exemplary multi-tasking architecture of a soft-turret Web server in accordance with an embodiment of the present invention.

FIG. 7 illustrates and example flow of various tasks involved in soft-turret Web server operations. As shown in FIG. 7, signaling can be received from a soft-turret client via a soft-turret proxy 714. In turn, soft-turret proxy 714 communicates the signaling to one or more services, such as an applications worker 704, telephony worker 708 and persistence worker 712. Particularly, the group leader of each worker (i.e., an applications group leader 702, a telephony group leader 706 and a persistence group leader, respectively) create their respective workers. Signaling information from the workers, in turn is communicated back to the soft-turret application through soft-turret proxy 714.

Figure 8:
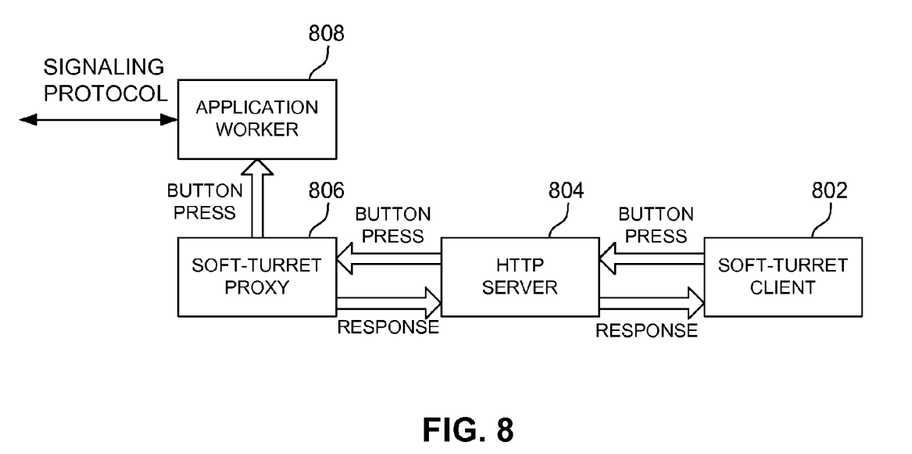
FIG. 8 illustrates an exemplary mechanism of button-press stimulus delivery from a soft-turret client to a server, in accordance with an embodiment of the present invention.

FIG. 8 illustrates an exemplary mechanism of button-press stimulus delivery from a soft-turret client to a server. In this example, a user of a soft-turret client 802 selects a button, such as a button to answer a line. The button data associated with the selection is communicated from the PC to an HTTP server 804, which in turn communicates the data to a soft-turret proxy 806. Soft-turret proxy 806 forwards the data to one or more services. A service, such as an application worker 808, communicates the data to a turret switching system using an appropriate signaling protocol.

Figure 9:
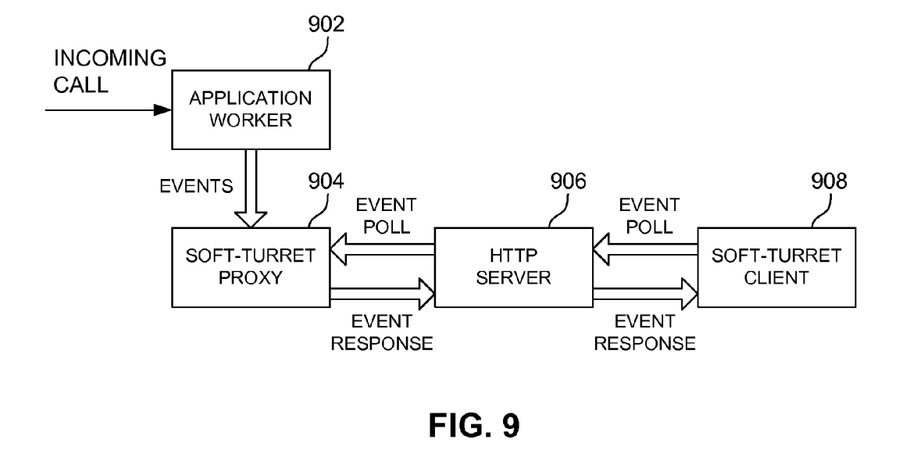
FIG. 9 illustrates an exemplary mechanism of event delivery from a soft-turret server to a client, in accordance with an embodiment of the present invention.

FIG. 9 illustrates an exemplary mechanism of event delivery from a soft-turret server to a client. In this example, signaling information about an incoming call is communicated to an application worker 902. A soft-turret client 908 polls an HTTP server 906 for line status change events. HTTP server, in turn, forwards the event poll to a soft-turret proxy 904. The HTTP poll requests are pended at the server until a line state change occurs. As soon as a line state change occurs, the server returns a response to the client, therefore, providing a real-time state change delivery mechanism. This response contains the specific information about line state changes. This technique is commonly known as HTTP long-poll or "Comet".

Events are communicated by the application worker 902 to the soft-turret proxy 904, which, in turn, communicates an event response to an HTTP server 906. The events are accepted and queued within the HTTP server so they can be dispatched to clients in batches. HTTP server 906 communicates the event response to a soft-turret client 908.

Figure 10:
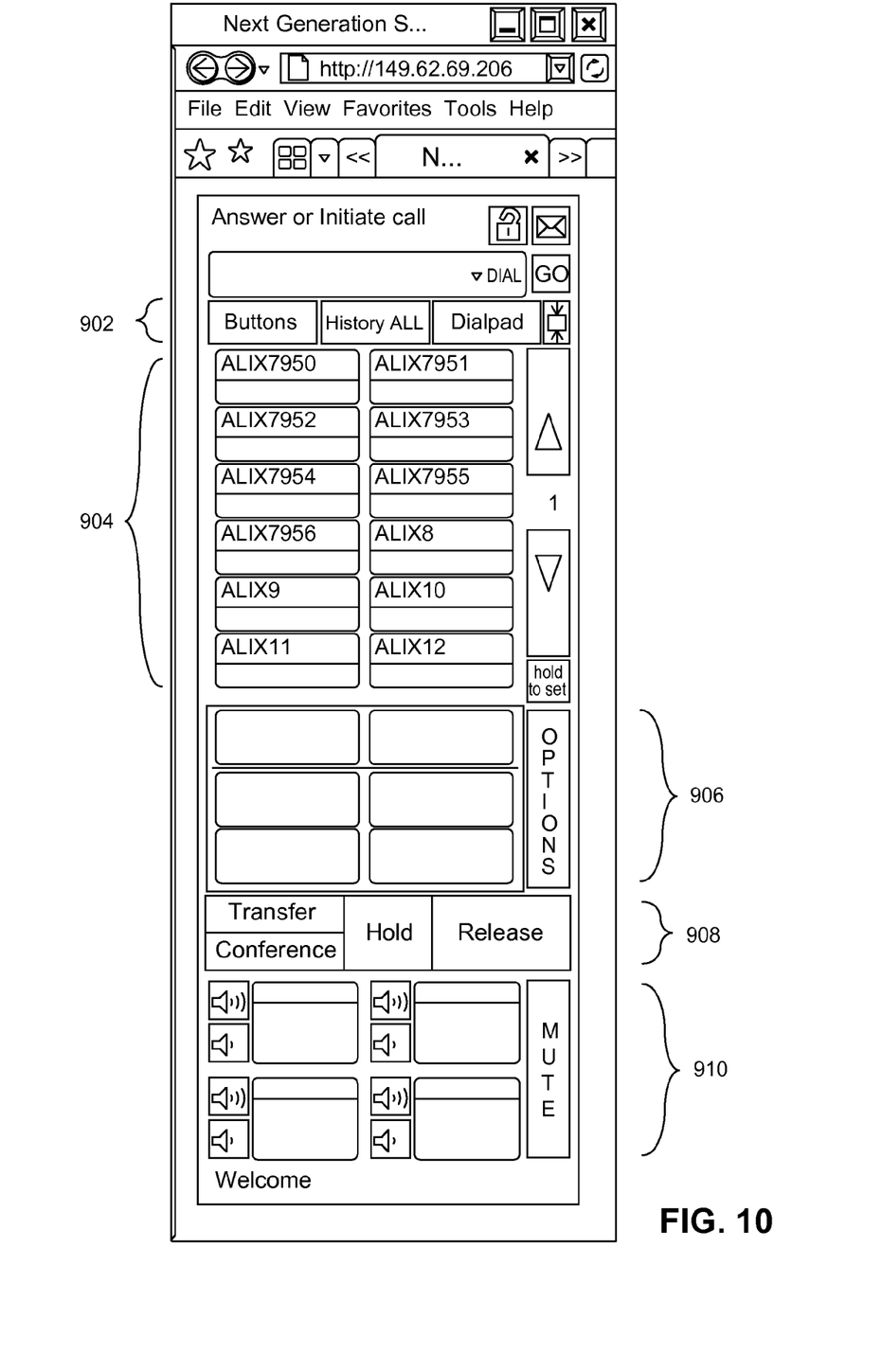
FIG. 10 depicts a screenshot of an exemplary soft-turret launched from within a Web browser on a PC, in accordance with an embodiment of the present invention.

FIG. 10 depicts a screenshot of an exemplary soft-turret launched from within a Web browser on a PC, in accordance with an embodiment of the present invention. As shown in FIG. 10, various sets of buttons and indicators are provided (902, 904, 906, 908, 910). These buttons and indicators provide the same features found on a hard turret, such as turrets 218, 318, 418 and 518 described above with respect to FIGS. 2-5, which are typically found on a trading floor. For example, a dialpad button 902 provides a user with a set of numbers used to make a call, and multiple lines can be selected through buttons 904. The same options available on the physical hard turret also are available on the GUI of the soft-turret through the options set of buttons 906. Similarly, transferring, conferencing, hold, release and mute button features are signaled through the GUI using button sets 908 and 910, respectively.

Synchronization of the voice and signaling data is achieved by seizing a voice line between a PSTN phone, a SIP phone or a SIP UA, as the case may be and communicating control and status data on a separate channel. Multiple lines, for example on a private wire network, may be bridged by a turret switching system. Similarly, the LHS and RHS may be bridged through a media bridge within the turret switching system.

A conference including of these voice lines may be provided on the seized line between the turret switching system and the remote phone, with the control and status (i.e., signaling) being communicated through a separate channel between a soft-turret application and a web server in communication with the turret switching system, using a GUI such as the one shown in FIG. 10.

The example embodiments of the invention may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more disk drives or memory cards (e.g., flash memory) for program and data storage, and a random access memory, for temporary data and program instruction storage. From a software standpoint, a CPU typically includes software resident on a storage media (e.g., a disk drive or memory card), which, when executed, directs the CPU in performing transmission and reception functions. The CPU software may run on an operating system stored on the storage media, such as, for example, UNIX or Windows (e.g., NT, XP, Vista), Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or computer-readable medium (i.e., also referred to as "machine readable medium") having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized (and navigated) in ways other than that shown in the accompanying figures. It is also to be understood that the procedures recited in the claims need not be performed in the order presented.

What is claimed is:

1. A communications system, comprising:
a turret switching system constructed to communicate to a Web server, a turret device, and to a remote communications device via a first communications network, the Web server being constructed to communicate to a client device via a second communications network, and the client device constructed to control switching across a plurality of lines; and
an interface having a button sheet corresponding to a plurality of line selectors and constructed to seize a corresponding line by causing the client device to communicate a predetermined message to the turret switching system over the second communications network.

2. The communications system according to claim 1, wherein the first communications network is a PSTN network and the remote communications device is a PSTN device.

3. The communications system according to claim 1, wherein the corresponding line is communicatively coupled to the communications device via the first communications network upon selection of one of the plurality of line selectors.

4. The communications system according to claim 1, wherein the predetermined message is communicated over the second communications network using SIP.

5. The communications system according to claim 1, wherein switching of the corresponding line is performed in the turret switching system.

6. The communications system according to claim 1, wherein the first communications network and the second communications network are IP networks.

7. A non-transitory computer-readable medium having stored thereon sequences of instructions, the sequences of instructions including instructions which when executed by a computer system causes the computer system to:
communicate to a Web server, a turret device, and to a remote communications device via a first communications network;
communicate to a client device via a second communications network;
control switching across a plurality of lines; and
seize a corresponding line by causing the client device to communicate a predetermined message to a turret switching system over the second communications network.

8. The non-transitory computer-readable medium of claim 7, wherein the first communications network is a PSTN network and the remote communications device is a PSTN device.

9. The non-transitory computer-readable medium of claim 7, wherein the corresponding line is communicatively coupled to the communications device via the first communications network upon selection of one of a plurality of line selectors.

10. The non-transitory computer-readable medium of claim 7, wherein the predetermined message is communicated over the second communications network using SIP.

11. The non-transitory computer-readable medium of claim 7, wherein switching of the corresponding line is performed in the turret switching system.

12. The non-transitory computer-readable medium of claim 7, wherein the first communications network and the second communications network are IP networks.

13. A method for providing a software based trading turret, comprising the steps of:
communicating, by a turret switching device, to a Web server, a turret device, and a remote communications device, via a first communications network;
communicating, by the turret switching device, to a client device via a second communications network;
controlling switching across a plurality of lines, by the turret switching device; and seizing a corresponding line by communicating a predetermined message to a turret switching system over the second communications network.

14. The method of claim 13, wherein the first communications network is a PSTN network and the remote communications device is a PSTN device.

15. The method of claim 13, wherein the corresponding line is communicatively coupled to the communications device via the first communications network upon selection of one of a plurality of line selectors.

16. The method of claim 13, wherein the predetermined message is communicated over the second communications network using SIP.

17. The method of claim 13, wherein switching of the corresponding line is performed in the turret switching system.

18. The method of claim 13, wherein the first communications network and the second communications network are IP networks.

* * * * *

UNITED STATES PATENT AND TRADEMARK OFFICE
CERTIFICATE OF CORRECTION

PATENT NO.         : 8,189,566 B2
APPLICATION NO.    : 12/476490
DATED              : May 29, 2012
INVENTOR(S)        : Aseem Bakshi et al.

It is certified that error appears in the above-identified patent and that said Letters Patent is hereby corrected as shown below:

In the Specification

COLUMN 1:

Line 64, "us" should read --use--.

COLUMN 2:

Line 62, "causes" should read --cause--.

COLUMN 4:

Line 44, "are" should read --is--.

COLUMN 5:

Line 12, "instance," should read --instance, when--.

COLUMN 6:

Line 12, "are" should read --is--; and
    Line 53, "use" should read --uses--.

COLUMN 7:

Line 34, "processes" should read --process--; and
    Line 38, "and" should read --an--.

COLUMN 8:

Line 34, "of" should be deleted.

Signed and Sealed this
Fifteenth Day of April, 2014

Michelle K. Lee
*Deputy Director of the United States Patent and Trademark Office*

CERTIFICATE OF CORRECTION (continued)
U.S. Pat. No. 8,189,566 B2

In the Claims

COLUMN 10:

Claim 7, Line 30, "causes" should read --cause--.